United States Patent
Hussain et al.

(10) Patent No.: US 11,574,634 B2
(45) Date of Patent: Feb. 7, 2023

(54) INTERFACING WITH APPLICATIONS VIA DYNAMICALLY UPDATING NATURAL LANGUAGE PROCESSING

(71) Applicant: Google LLC, Mountain View, CA (US)

(72) Inventors: Quazi Hussain, Mountain View, CA (US); Adam Coimbra, Mountain View, CA (US); Ilya Firman, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 402 days.

(21) Appl. No.: 16/722,694

(22) Filed: Dec. 20, 2019

(65) Prior Publication Data

US 2021/0158814 A1    May 27, 2021

Related U.S. Application Data

(63) Continuation of application No. 16/622,805, filed as application No. PCT/US2019/063648 on Nov. 27, 2019.

(51) Int. Cl.
*G10L 15/22* (2006.01)
*G06F 9/451* (2018.01)
(Continued)

(52) U.S. Cl.
CPC .............. *G10L 15/22* (2013.01); *G06F 3/167* (2013.01); *G06F 9/453* (2018.02); *G06F 9/54* (2013.01);
(Continued)

(58) Field of Classification Search
CPC ......... G10L 15/20; G10L 15/22; G10L 15/30; G10L 2015/221; G10L 15/222;
(Continued)

(56) References Cited

U.S. PATENT DOCUMENTS 9,959,129 B2   5/2018   Kannan et al.
10,249,296 B1  4/2019   Mutagi et al.
(Continued)

FOREIGN PATENT DOCUMENTS

DE   102014204108    9/2014
EP   3346400         7/2018
EP   3 392 876 A1   10/2018

OTHER PUBLICATIONS

Perez, Sarah, "You can now use Alexa to move around inside apps like Netflix and Hulu on Fire TV Cube", Oct. 26, 2018 (3 pages).
International Search Report and Written Opinion for Application No. PCT/US2019/063648, dated Aug. 13, 2020, 14 pages.

*Primary Examiner* — Richemond Dorvil
*Assistant Examiner* — Alexander G Marlow
(74) *Attorney, Agent, or Firm* — Dority & Manning, P.A.

(57) ABSTRACT

Dynamic interfacing with applications is provided. For example, a system receives a first input audio signal. The system processes, via a natural language processing technique, the first input audio signal to identify an application. The system activates the application for execution on the client computing device. The application declares a function the application is configured to perform. The system modifies the natural language processing technique responsive to the function declared by the application. The system receives a second input audio signal. The system processes, via the modified natural language processing technique, the second input audio signal to detect one or more parameters. The system determines that the one or more parameters are compatible for input into an input field of the application. The system generates an action data structure for the application. The system inputs the action data structure into the application, which executes the action data structure.

19 Claims, 4 Drawing Sheets

(51) Int. Cl.
*G06F 9/54* (2006.01)
*G10L 15/18* (2013.01)
*G06F 3/16* (2006.01)
*G06N 20/00* (2019.01)

(52) U.S. Cl.
CPC .......... *G10L 15/1815* (2013.01); *G06N 20/00* (2019.01); *G10L 2015/223* (2013.01)

(58) Field of Classification Search
CPC ......... G10L 2015/223; G10L 2015/225; G10L 15/1822; G10L 15/083; G10L 15/063; G10L 2015/0635; G06F 3/167; G06F 16/2457; G06F 9/54; G06F 9/453
See application file for complete search history.

(56) References Cited

U.S. PATENT DOCUMENTS

| | | |
|---|---|---|
| 10,276,170 B2 | 4/2019 | Gruber et al. |
| 10,297,253 B2 | 5/2019 | Walker, II et al. |
| 10,943,591 B2 | 3/2021 | James et al. |
| 11,170,768 B2* | 11/2021 | Woo ........................ G10L 15/30 |
| 11,204,787 B2* | 12/2021 | Radebaugh ......... G10L 15/1815 |
| 11,232,797 B2 | 1/2022 | James et al. |
| 2014/0278419 A1 | 9/2014 | Bishop et al. |
| 2016/0042748 A1 | 2/2016 | Jain et al. |
| 2016/0155442 A1 | 6/2016 | Kannan et al. |
| 2016/0203002 A1* | 7/2016 | Kannan ................... G10L 15/22 715/708 |
| 2016/0225370 A1 | 8/2016 | Kannan et al. |
| 2017/0358303 A1* | 12/2017 | Walker, II ............... G10L 15/22 |

* cited by examiner

INTERFACING WITH APPLICATIONS VIA DYNAMICALLY UPDATING NATURAL LANGUAGE PROCESSING

CROSS-REFERENCES TO RELATED APPLICATIONS

This application claims the benefit of priority under 35 U.S.C. § 120 as a continuation of U.S. patent application Ser. No. 16/622,805, filed Dec. 13, 2019, which is a U.S. National Stage under 35 U.S.C. § 371 of International Patent Application No. PCT/US2019/063648, filed Nov. 27, 2019 and designating the United States, each of which is hereby incorporated by reference herein in its entirety.

BACKGROUND

A computing device can execute an application. The application can provide a user interface that can receive input information, perform a function, and output information.

SUMMARY

This technical solution is generally directed to interfacing with applications, such as third-party (3P) applications, via dynamically updating natural language processing ("NLP") or natural language understanding. By dynamically updating NLP, this technical solution can facilitate voice-based interactions with applications (including 3P applications)) via a digital assistant.

It can be challenging to interface with an application to execute an action on computing devices having limited interfaces, or using a limited interface. Using additional interfaces to communicate with an application can increase computing resource consumption, entail using excessive interfaces, or delay or otherwise introduce latencies into execution and completion of an action by the application.

Thus, this technical solution can leverage a protocol to receive declarations from an application. The technical solution can use the declarations to update, in real-time (e.g., responsive to invocation of the application and receipt of the declarations), a natural language understanding or processing technique used to parse or process voice input. The technical solution can use the updated NLP technique to process subsequent voice input in order to improve the accuracy, reliability and likelihood of detecting input parameters used by the application to execute an action.

At least one aspect of the present technical solution is directed to a system to dynamically interface with applications. The system can include a digital assistant component executed by a client computing device. The computing device can include one or more processors and memory. The digital assistant component can execute a natural language processor component, an application manager component, and a direct action application programming interface ("API"). The NLP component can receive a first input audio signal detected by a microphone of the client computing device. The NLP component can process, via a natural language processing technique, the first input audio signal to identify an indication of an application. The application manager component can activate, responsive to the indication, the application for execution on the client computing device. The application can declare, to the digital assistant via a protocol, a function the application is configured to perform. The NLP component can modify the natural language processing technique responsive to the function declared by the application. The NLP component can receive a second input audio signal detected by the microphone of the client computing device. The NLP component can process, via the modified natural language processing technique, the second input audio signal to detect one or more parameters. The NLP component can determine, based on a comparison between the one or more parameters and the function declared by the application, that the one or more parameters are compatible for input into an input field of the application activated by the digital assistant on the client computing device. The direct action API can generate, responsive to the determination of compatibility and based on the one or more parameters, an action data structure for the application. The direct action API can input the action data structure into the application via the protocol to cause the application to execute the action data structure and update a user interface element of the application.

At least one aspect of the present technical solution is directed to a method of dynamically interfacing with applications. The method can be performed by a digital assistant component executed by a client computing device. The method can include the digital assistant component receiving a first input audio signal detected by a microphone of the client computing device. The method can include the digital assistant component processing, via a natural language processing technique, the first input audio signal to identify an indication of an application. The method can include the digital assistant component activating, responsive to the indication, the application for execution on the client computing device. The application can declare, to the digital assistant via a protocol, a function the application is configured to perform. The method can include the digital assistant component modifying the natural language processing technique responsive to the function declared by the application. The method can include the digital assistant component receiving a second input audio signal detected by the microphone of the client computing device. The method can include the digital assistant component processing, via the modified natural language processing technique, the second input audio signal to detect one or more parameters. The method can include the digital assistant component determining, based on a comparison between the one or more parameters and the function declared by the application, that the one or more parameters are compatible for input into an input field of the application activated by the digital assistant on the client computing device. The method can include the digital assistant component generating, responsive to the determination of compatibility and based on the one or more parameters, an action data structure for the application. The method can include the digital assistant component inputting the action data structure into the application via the protocol to cause the application to execute the action data structure and update a user interface element of the application.

At least one aspect is directed to a system to dynamically interface with applications. The system can include one or more processors and memory. For example, the system can include a data processing system executed by a client computing device. The system can include a digital assistant component executed by the one or more processors and memory. The digital assistant component can activate, responsive to first input audio, an application for execution on the client computing device. Activation of the application can cause the application to declare, to the digital assistant component via a protocol, a function the application is configured to perform. The digital assistant component can modify the natural language processing technique responsive to the function declared by the application. The digital assistant component can receive a second input audio signal detected by the microphone of the client computing device. The digital assistant component can process, via the modified natural language processing technique, the second input audio signal to detect one or more parameters. The digital assistant component can determine, based on a comparison between the one or more parameters and the function declared by the application, that the one or more parameters are compatible for input into an input field of the application activated by the digital assistant on the client computing device. The digital assistant component can generate, responsive to the determination of compatibility and based on the one or more parameters, an action data structure for the application. The digital assistant component can input the action data structure into the application via the protocol to cause the application to execute the action data structure and update a user interface element of the application. The digital assistant component can transmit a request for a content to a remote data processing system. The digital assistant component can present, responsive to receipt of the content item from the remote data processing system, a content item selected by the remote data processing system.

At least one aspect is directed to a method of dynamically interfacing with applications. The method can be performed by one or more processors and memory. For example, the method can be performed by a data processing system executed by a client computing device. The method can be performed by a digital assistant component executed by the one or more processors and memory. The method can include the digital assistant component activating, responsive to first input audio, an application for execution on the client computing device. Activation of the application can cause the application to declare, to the digital assistant component via a protocol, a function the application is configured to perform. The method can include the digital assistant component modifying the natural language processing technique responsive to the function declared by the application. The method can include the digital assistant component receiving a second input audio signal detected by the microphone of the client computing device. The method can include the digital assistant component processing, via the modified natural language processing technique, the second input audio signal to detect one or more parameters. The method can include the digital assistant component determining, based on a comparison between the one or more parameters and the function declared by the application, that the one or more parameters are compatible for input into an input field of the application activated by the digital assistant on the client computing device. The method can include the digital assistant component generating, responsive to the determination of compatibility and based on the one or more parameters, an action data structure for the application. The method can include the digital assistant component inputting the action data structure into the application via the protocol to cause the application to execute the action data structure and update a user interface element of the application. The method can include the digital assistant component transmitting a request for a content to a remote data processing system. The method can include the digital assistant component presenting, responsive to receipt of the content item from the remote data processing system, a content item selected by the remote data processing system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
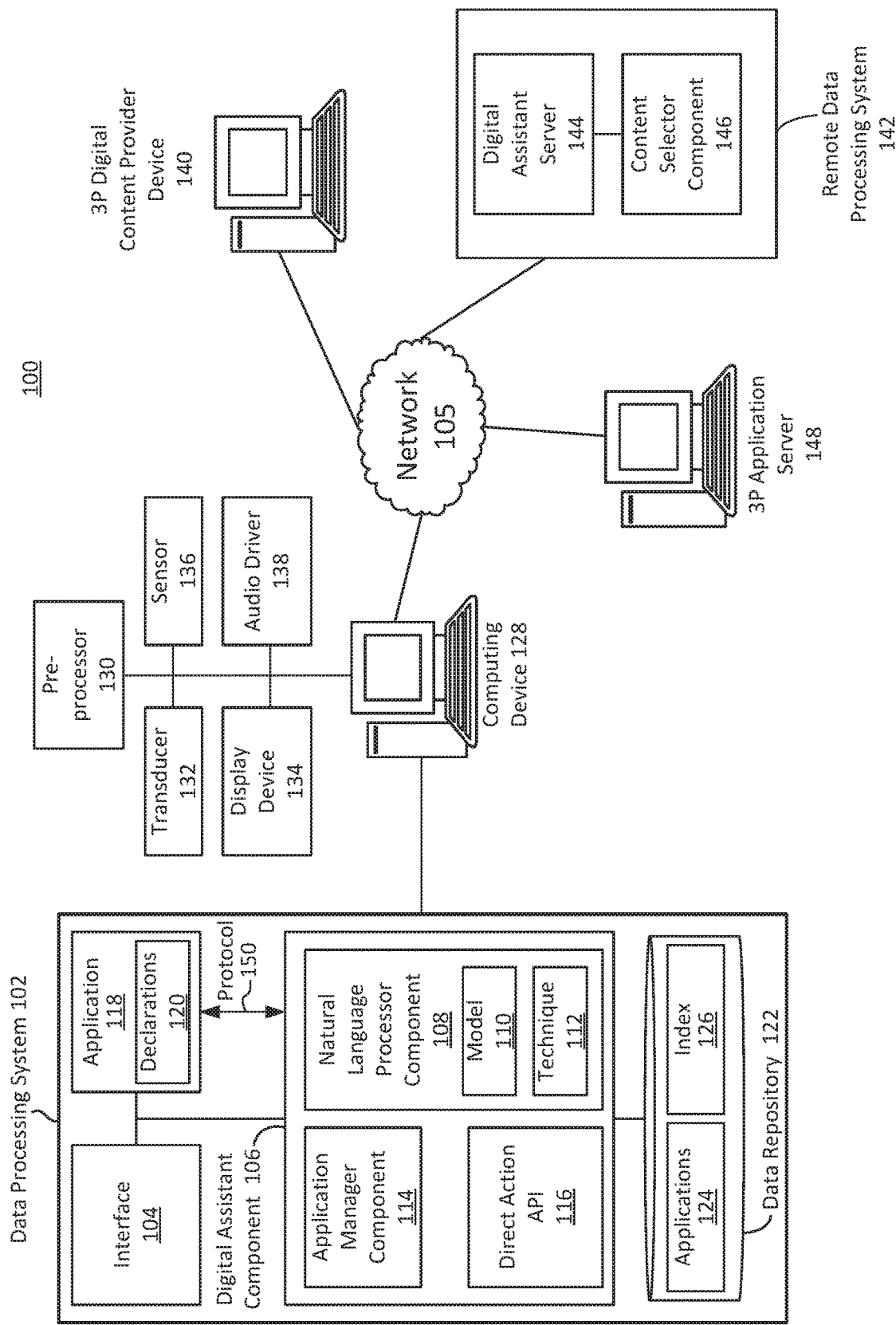
FIG. 1 is an illustration of a system to dynamically interface with applications, in accordance with an implementation.

Following below are more detailed descriptions of various concepts related to, and implementations of, methods, apparatuses, and systems of dynamically interfacing with applications. The various concepts introduced above and discussed in greater detail below may be implemented in any of numerous ways.

This technical solution is generally directed to interfacing with third-party application. Systems and methods of this technical solution can interface with (3P) applications by dynamically updating a natural language processing technique (or natural language understanding). In a voice-based computing environment, such as when a mode of input is based on voice input (e.g., audio input signals detected by a microphone of computing device), it can be challenging to interface with a 3P application to execute an action. For example, a digital assistant executing on a mobile computing device (e.g., a smartphone) can receive a voice input. The digital assistant can invoke or launch an application for execution on the smartphone (or at least partial execution on the smartphone). However, the application may not be configured with a voice interface (e.g., a user interface that allows for voice input, or natural language processing) to allow for the receipt of input parameters via voice input. Without the input parameters, the application may be unable to perform an action, or unable to accurately and reliably perform the action. With a partial set of input parameters, the application may erroneously perform the action (e.g., output an erroneous or undesired result), or incorrectly perform the action (e.g., perform the wrong action). In some cases, the application can request the additional parameters in order to perform the action using non-voice based interface (e.g., display device, touch input interface, gesture interface, icons, buttons, drop-down menus, keyboard, or mouse). Thus, without a full set of input parameters, the application may either perform an erroneous action, or activate additional interfaces that can result in wasted computing resource utilization (e.g., additional power consumption, computing processing) and introduce delays in performance or completion of the action by the application (e.g., additional requests, prompts, remote procedure calls to obtain the input parameters).

Thus, systems and methods of this technical solution are generally directed to interfacing with third-party ("3P") application via dynamically updating natural language processing ("NLP") or natural language understanding. By dynamically updating NLP, this technical solution can facilitate voice-based interactions with 3P applications via a digital assistant. By providing voice-based interactions, the technical limitations associated with alternative interaction methods (e.g. touch) may be overcome for the 3P application: for example, users who may struggle with a touch interface due to physical constraints may benefit. Systems and methods of this technical solution can leverage a protocol to receive declarations from an application. The technical solution can use the declarations to update, in real-time (e.g., responsive to invocation of the application and receipt of the declarations), a natural language understanding or processing technique used to parse or process voice input. The technical solution can use the updated NLP technique to process subsequent voice input in order to improve the accuracy, reliability and likelihood of detecting input parameters used by the application to execute an action.

For example, a voice input to a smartphone can include "book a table at Restaurant_Booking_App." The digital assistant can identify the mobile application Restaurant_Booking_App in the voice input, and then launch the Restaurant_Booking_App mobile application on the smartphone. The Restaurant_Booking_App mobile application can declare, to the digital assistant via a protocol, what functions the application can perform or a state of a user interface of the application. Using that information, the digital assistant can better understand subsequent voice inputs or voice queries related to the Restaurant_Booking_App application. For example, if the subsequent voice input is "at Example_Italian_Restaurant", then the digital assistant can determine that the voice input is a continuation of a reservation via the Restaurant_Booking_App application. The digital assistant can then generate an action data structure with information or parameters to make the reservation, and transmit the action data structure to the Restaurant_Booking_App application via the protocol.

This technical solution can determine the context of an application based on the current state of the application, modify an NLP technique to improve the ability of the digital assistant to detect input parameters in a subsequent voice input that are compatible with the current state or context of the application, and then input those parameters into the application to allow the application to efficiently, accurately, and reliably execute actions. By providing the input parameters used by the application to perform the action, this technical solution can reduce or eliminate the number of prompts or requests for input by the application, while limiting or eliminating the usage of different user interfaces (e.g., display device, touch screen, gestures, keyboard, or mouse). Systems and methods of this technical solution can, therefore, provide a seamless process of using voice input to launch an application and execute an action by the application. In this manner the beneficial aspects of a voice interface may be provided to an application.

FIG. 1 illustrates an example system 100 that dynamically interfaces with applications. The system 100 can include content selection infrastructure. The system 100 can include a data processing system 102. The data processing system 102 can include or execute on a computing device 128. The data processing system 102 can communicate with one or more of a 3P content provider device 140, remote data processing system 142, or 3P application server 148 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 128, such as a laptop, desktop, tablet, personal digital assistant, smart phone, portable computers, or speaker. For example, via the network 105 a user of the computing device 128 can access information or data provided by a 3P content provider device 140. The computing device 128 may or may not include a display; for example, the computing device may include limited types of user interfaces, such as a microphone and speaker. In some cases, the primary user interface of the computing device 128 may be a microphone and speaker. The computing device 128 can interface with or be included in a voice-based computing environment.

The network 105 can be used by the data processing system 102 to access information resources such as applications, web pages, web sites, domain names, or uniform resource locators that can be presented, output, rendered, or displayed by the client computing device 128. For example, via the network 105 a user of the client computing device 128 can access information or data provided by the 3P content provider device 140. The network 105 can include or constitute a sub-network of information resources available on the internet that are associated with a content placement or search engine results system, or that are eligible to include third party digital components as part of a digital component placement campaign.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include, interface with, communicate with, or otherwise access a 3P application server 148. The data processing system 102 can communicate with the 3P application server 148 via network 105. The 3P application server 148 can be remote from, and different from, the data processing system 102, remote data processing system 142, 3P digital content provider device 140, and computing device 128. The 3P application server 148 can be associated with a developer of the application 118. The 3P application server 148 can facilitate execution of the application 118. For example, the 3P application server 148 can perform backend processing for the application 118. The application 118 executing on the computing device 128 can execute a frontend component of the application 118, and the 3P application server 148 can execute a backend component of the application 118. The application 118 executing on the computing device 128 can transmit remote procedure calls or other requests or data to the 3P application server 148. The 3P application server 148 can transmit data, information, or requests to the application 118 to perform a function or execute an action. The 3P application server 148 can modify or change a state of the application 118, which can result in the application declaring functionality of the application or invocation of the digital assistant component 106.

The system 100 can include at least one remote data processing system 142. The remote data processing system 142 can include at least one logic device such as a computing device having a processor to communicate via the network 105, for example with the data processing system 102, 3P content provider device 140 (e.g., content provider). The remote data processing system 142 can include at least one computation resource, server, processor or memory. For example, the remote data processing system 142 can include a plurality of computation resources or servers located in at least one data center. The remote data processing system 142 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the remote data processing system 142 components, including servers and storage systems, and coupling them with advanced system management tools allows more efficient use of server resources, which saves power and processing requirements and reduces bandwidth usage.

The remote data processing system 142 can include a digital assistant server 144 and a content selector component 146. The digital assistant server 144 can be designed, constructed and operational to perform one or more function in communication with the digital assistant component 106 of the computing device 128. The content selector component 146 can be designed, constructed and operational to select digital component items (e.g., content items) provided by the 3P digital content provider device 140. The content selector component 146 can select content items responsive to a request for content from the computing device 128. The content selector component 146 can transmit selected content items to the computing device 128 for presentation (e.g., audio output, visual output, or audiovisual output).

The system 100 can include, access, or otherwise interact with at least one 3P content provider device 140. The 3P content provider device 140 can include at least one logic device such as a computing device having a processor to communicate via the network 105, for example with the computing device 128, the data processing system 102, or the remote data processing system 142. The 3P content provider device 140 can include at least one computation resource, server, processor or memory. For example, the 3P content provider device 140 can include a plurality of computation resources or servers located in at least one data center. The 3P content provider device 140 can include or refer to a service provider device, or goods provider device.

The 3P digital content provider device 140 can provide audio based digital components for presentation by the computing device 128 as an audio output digital component. The digital component can include responses to search queries or requests. The digital component can include information from databases, search engines, or networked resources. For example, the digital component can include news information, weather information, sports information, encyclopedia entries, dictionary entries, or information from digital textbooks. The digital component can include offers for a good or service, such as a voice based message that states: "Would you like me to order you a taxi?" The 3P content provider device 140 can include memory to store a series of audio digital components that can be provided in response to a voice based query. The 3P content provider device 140 can also provide audio based digital components (or other digital components) to the data processing system 102 where they can be stored in the data repository 122. The data processing system 102 can select the audio digital components and provide (or instruct the content provider computing device 140 to provide) the audio digital components to the client computing device 128. The audio based digital components can be exclusively audio or can be combined with text, image, or video data. The digital components or content items can include images, text, video, multimedia, or other types of content in one or more formats.

The remote data processing system 142 can include a content placement system having at least one computation resource or server. The remote data processing system 142 can include, interface, or otherwise communicate with at least one content selector component 146. The remote data processing system 142 can include, interface, or otherwise communicate with at least one digital assistant server 144.

The content selector component 146 and digital assistant server 144 can each include at least one processing unit or other logic device such as programmable logic array engine, or module configured to communicate with one another or other resources or databases. The content selector component 146 and digital assistant server 144 can be separate components, a single component, or part of the remote data processing system 142. The system 100 and its components, such as the remote data processing system 142, can include hardware elements, such as one or more processors, logic devices, or circuits.

The remote data processing system 142 can obtain anonymous computer network activity information associated with a plurality of computing devices 128. A user of a computing device 128 can affirmatively authorize the remote data processing system 142 to obtain network activity information corresponding to the user's computing device 128. For example, the remote data processing system 142 can prompt the user of the computing device 128 for consent to obtain one or more types of network activity information. The identity of the user of the computing device 128 can remain anonymous and the computing device 128 can be associated with a unique identifier (e.g., a unique identifier for the user or the computing device provided by the data processing system or a user of the computing device). The remote data processing system 142 can associate each observation with a corresponding unique identifier.

A 3P digital content provider device 140 can establish an electronic content campaign. The electronic content campaign can be stored as content data in a data repository of the content selector component 146. An electronic content campaign can refer to one or more content groups that correspond to a common theme. A content campaign can include a hierarchical data structure that includes content groups, digital component data objects, and content selection criteria. To create a content campaign, 3P digital content provider device 140 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., remote data processing system 142 or 3P digital content provider device 140), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 128. In some cases, an impression can refer to a viewable or audible impression; e.g., the digital component object is at least partially (e.g., 20%, 30%, 30%, 40%, 50%, 60%, 70%, or more) viewable on a display device of the client computing device 128, or audible via a speaker (e.g., transducer 132) of the computing device 128. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The 3P digital content provider device 140 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the 3P digital content provider device 140 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the 3P digital content provider device 140 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The 3P digital content provider device 140 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The 3P digital content provider device 140 can provide one or more keywords to be used by the remote data processing system 142 to select a digital component object provided by the 3P digital content provider device 140. The 3P digital content provider device 140 can identify one or more keywords to bid on, and further provide bid amounts for various keywords. The 3P digital content provider device 140 can provide additional content selection criteria to be used by the remote data processing system 142 to select digital component objects. Multiple 3P digital content provider devices 140 can bid on the same or different keywords, and the remote data processing system 142 can run a content selection process or ad auction responsive to receiving an indication of a keyword of an electronic message.

The 3P digital content provider device 140 can provide one or more digital component objects for selection by the remote data processing system 142. The remote data processing system 142 (e.g., via content selector component 146) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the data processing system 102 can transmit the digital component object for presentation via the computing device 128, rendering on a computing device 128 or display device of the computing device 128. Rendering can include displaying the digital component on a display device, or playing the digital component via a speaker of the computing device 128. The remote data processing system 142 can provide instructions to a computing device 128 to render the digital component object. The remote data processing system 142 can instruct the digital assistant component 106 of the computing device 128, or an audio driver 138 of the computing device 128, to generate audio signals or acoustic waves. The remote data processing system 142 can instruct the application 118 executed by the computing device 128 to present the selected digital component object. For example, the application 118 can include a slot (e.g., a content slot) in which the digital component object can be presented (e.g., audio slot or visual slot).

The data processing system 102 can include, execute, or otherwise communicate with a content selector component 146 to receive the queries, keywords or trigger keyword identified by the natural language processor and select, based on the trigger keyword, a digital component. The content selector component 146 can select the digital component via a real-time content selection process. The content selection process can include, for example, performing a search via a search engine, or accessing a database stored on a remote server or device such as a 3P content provider device 140. The content selection process can refer to, or include, selecting sponsored digital component objects provided by third party content providers 140. The real-time content selection process can include a service in which digital components provided by multiple content providers are parsed, processed, weighted, or matched in order to select one or more digital components to provide to the computing device 128. The content selector component 146 can perform the content selection process in real-time. Performing the content selection process in real-time can refer to performing the content selection process responsive to the request for content received via the client computing device 128. The real-time content selection process can be performed (e.g., initiated or completed) within a time interval of receiving the request (e.g., 1 second, 2 seconds, 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 128, or within a time interval after the communication session is terminated. The data processing system 102 can select an audio chime to provide subsequent to completion of the digital component selection process or other digital task.

For example, the data processing system 102 can include a content selector component 146 designed, constructed, configured or operational to select digital component objects. To select digital components for display in a voice-based environment, the data processing system 102 (e.g., via NLP component 108) can parse the input audio signal to identify queries, keywords (e.g., a trigger keyword), and use the keywords to select a matching digital component. The data processing system 102 can select the matching digital component based on a broad match, exact match, or phrase match. For example, the content selector component 146 can analyze, parse, or otherwise process subject matter of candidate digital components to determine whether the subject matter of the candidate digital components correspond to the subject matter of the keywords or phrases of the input audio signal detected by the microphone of the client computing device 128. The content selector component 146 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 146 may process the metadata to determine whether the subject matter of the candidate digital component corresponds to the input audio signal.

3P digital content providers 140 may provide additional indicators when setting up a content campaign that includes digital components. The content provider may provide information at the content campaign or content group level that the content selector component 146 may identify by performing a lookup using information about the candidate digital component. For example, the candidate digital component may include a unique identifier, which may map to a content group, content campaign, or content provider. The content selector component 146 may determine, based on information stored in content campaign data structure in data repository 122, information about the 3P digital content provider device 140.

The remote data processing system 142 can receive, via a computer network, a request for content for presentation on a computing device 128. The data processing system 102 can identify the request by processing an input audio signal detected by a microphone of the client computing device 128. The request can include selection criteria of the request, such as the device type, location, and a keyword associated with the request.

Responsive to the request, the remote data processing system 142 can select a digital component object from a data repository or a database associated with the 3P digital content provider device 140, and provide the digital component for presentation via the computing device 128 via network 105. The computing device 128 can interact with the digital component object. The computing device 128 can receive an audio response to the digital component. The computing device 128 can receive an indication to select a hyperlink or other button associated with the digital component object that causes or allows the computing device 128 to identify a service provider, request a service from the service provider, instruct the service provider to perform a service, transmit information to the service provider, or otherwise query the service provider device.

The computing device 128 (or client computing device or client device) can include or execute a data processing system 102. The data processing system 102 can include, interface, or otherwise communicate with at least one interface 104. The data processing system 102 can include, interface, or otherwise communicate with at least one digital assistant component 106. The data processing system 102 can include, interface, or otherwise communicate with at least one natural language processor ("NLP") component 108. The data processing system 102 can include, interface, or otherwise communicate with at least one model 110. The data processing system 102 can include, interface, or otherwise communicate with at least one technique 112. The data processing system 102 can include, interface, or otherwise communicate with at least one application manager component 114. The data processing system 102 can include, interface, or otherwise communicate with at least one direct action application programming interface ("API") 116. The data processing system 102 can include, interface, communicate or execute at least one application 118. The data processing system 102 can at least partially execute at least one application 118 (e.g., the application can include a client component and a server component). The data processing system 102 can include, interface, or otherwise communicate with at least one data repository 122.

The data repository 122 can include one or more local or distributed databases, and can include a database management system. The data repository 122 can include computer data storage or memory and can store applications 124, application data, profiles, indexes 126, preference, among other data. The application 124 in data repository 122 can refer to or include a data structure or data file storing information associated with an application, such as declarations, input fields, states, context information, user interfaces, input parameters, or preferences. The application 118 can refer to the activated, launched, invoked or executed application 118, which can correspond to the information about the application 118 stored in application 124, which can refer to or include a data structure, in data repository 122. Applications 124 can include an executable file, application package file, configuration file, or other data that facilitates execution of the application.

The data repository 122 can include, store, manage, or maintain an index 126. The index 126 can include a mapping, association, or link that relates keywords or terms with applications. The index 126 can include a table with keywords or terms that map with candidate applications. The index 126 can include a list of applications that are installed on the computing device 128. The index 126 can include a list of applications that are authorized or accessible to the computing device 128, or an account thereof. The index 126 can include credentials or authentication information used to access an application. For example, the index can include a list of applications accessible to the computing device 128, and account information used to gain access to the application. The index 126 can link keywords or terms to an application or other information that facilitates identifying an application to invoke, activate or launch responsive to an input audio signal or voice input.

The interface 104, digital assistant component 106, NLP component 108, application manager component 114, direct action API or other component of the data processing system 102 can each include at least one processing unit or other logic device such as programmable logic array engine, or module configured to communicate with one another or other resources or databases. The interface 104, digital assistant component 106, NLP component 108, application manager component 114, direct action API or other components of the data processing system 102 can be separate components, a single component, or part of the data processing system 142. The system 100 and its components, such as the data processing system 102, can include hardware elements, such as one or more processors, logic devices, or circuits.

The computing device 128 can include, interface, or otherwise communicate with at least one sensor 136, transducer 132, audio driver 138, pre-processor 130, or display device 134. The sensor 136 can include, for example, an ambient light sensor, proximity sensor, temperature sensor, accelerometer, gyroscope, motion detector, GPS sensor, location sensor, microphone, or touch sensor. The transducer 132 can include a speaker or a microphone. The audio driver 138 can provide a software interface to the hardware transducer 132. The audio driver can execute the audio file or other instructions provided by the data processing system 102 to control the transducer 132 to generate a corresponding acoustic wave or sound wave. The display device 134 can include one or more component or functionality of display 435 depicted in FIG. 4. The pre-processor 130 can be configured to detect a trigger keyword, predetermined hot word, initiation keyword, or activation keyword. In some cases, the trigger keyword can include a request to perform an action. In some cases, the trigger keyword can include predetermined action keyword to enable or activate the computing device 128, and the request keywords can follow the trigger keyword or hot word. The pre-processor 130 can be configured to detect a keyword and perform an action based on the keyword. The pre-processor 130 can detect a wake-up word or other keyword or hotword, and responsive to the detection, invoke the digital assistant component 106 of the data processing system 102 executed by computing device 128. In some cases, the pre-processor 130 can filter out one or more terms or modify the terms prior to transmitting the terms to the remote data processing system 142 for further processing. The pre-processor 130 can convert the analog audio signals detected by the microphone into a digital audio signal, and transmit or provide one or more data packets carrying the digital audio signal to the data processing system 102 or the remote data processing system 142 via the network 105. In some cases, the pre-processor 130 can provide, to the digital assistant component 106 or the remote data processing system 142, data packets carrying some or all of the input audio signal, responsive to detecting an instruction to perform such transmission. The instruction can include, for example, a trigger keyword or other keyword or approval to transmit data packets comprising the input audio signal to the data processing system 102 or the remote data processing system 142.

The client computing device 128 can be associated with an end user that enters voice queries as audio input into the client computing device 128 (via the sensor 136) and receives audio output in the form of a computer generated voice that can be provided from the data processing system 102 (or the 3P content provider device 140) to the client computing device 128, output from the transducer 132 (e.g., a speaker). The computer generated voice can include recordings from a real person or computer generated language.

The data processing system 102 can include an interface 104 designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can facilitate communications between one or more component of the system 100, such as between the digital assistant component 106, the application 118, and the data repository 122.

The data processing system 102 can include an application, script or program installed at the client computing device 128, such as an application to communicate input audio signals to the interface 104 of the data processing system 102 and to drive components of the client computing device to render output audio signals. The data processing system 102 can receive data packets or other signal that includes or identifies an audio input signal. For example, the data processing system 102 can execute or run the NLP component 108 to receive or obtain the audio signal and parse the audio signal. For example, the NLP component 108 can provide for interactions between a human and a computer. The NLP component 108 can be configured with techniques for understanding natural language and allowing the data processing system 102 to derive meaning from human or natural language input. The NLP component 108 can include or be configured with technique based on machine learning, such as statistical machine learning. The NLP component 108 can utilize decision trees, statistical models, or probabilistic models to parse the input audio signal. The NLP component 108 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 108 converts the audio input signal into recognized text by comparing the input signal against a stored, representative set of audio waveforms (e.g., model 110 or technique 112) and choosing the closest matches. The set of audio waveforms can be stored in model 110 or other database accessible to the data processing system 102. The representative waveforms are generated across a large set of users, and then may be augmented with speech samples from the user. After the audio signal is converted into recognized text, the NLP component 108 matches the text to words that are associated, for example via using a model 110 that has been trained across users or through manual specification, with actions that the data processing system 102 can serve.

The audio input signal can be detected by the sensor 136 or transducer 132 (e.g., a microphone) of the client computing device 128. Via the transducer 132, the audio driver 138, or other components the client computing device 128 can provide the audio input signal to the data processing system 102, where it can be received (e.g., by the interface 104) and provided to the NLP component 108 or stored in the data repository 122.

The NLP component 108 can obtain the input audio signal. From the input audio signal, the NLP component 108 can identify at least one request or at least one trigger keyword corresponding to the request. The request can indicate intent or subject matter of the input audio signal. The trigger keyword can indicate a type of action likely to be taken. For example, the NLP component 108 can parse the input audio signal to identify at least one request to invoke an application. The NLP component 108 can parse the input audio signal to identify at least one request, such as a request to leave home for the evening to attend dinner and a movie. The keyword can include at least one word, phrase, root or partial word, or derivative indicating an action to be taken. For example, the keyword "go" or "to go to" from the input audio signal can indicate a need for transport. In this example, the input audio signal (or the identified request) does not directly express an intent for transport, however the keyword indicates that transport is an ancillary action to at least one other action that is indicated by the request.

The NLP component 108 can parse the input audio signal to identify, determine, retrieve, or otherwise obtain the request and the keyword. For instance, the NLP component 108 can apply a semantic processing technique (e.g., technique 112) to the input audio signal to identify the keyword or the request. The NLP component 108 can apply the semantic processing technique 112 to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 108 can apply a semantic processing technique 112, or other natural language processing technique, to the data packets comprising the sentence to identify trigger phrases "do my laundry" and "do my dry cleaning". The NLP component 108 can further identify multiple trigger keywords, such as laundry, and dry cleaning. For example, the NLP component 108 can determine that the trigger phrase includes the trigger keyword and a second trigger keyword.

The NLP component 108 can identify search queries or trigger phrases corresponding to performing a search or other request for information. The NLP component 108 can determine that the input audio signal corresponds to a request for information about a topic, event, current event, news event, dictionary definition, historical event, person, place or thing. For example, the NLP component 108 can determine that the input audio signal corresponds to a search query for information about a historical event, such as "When did the American Revolution take place?" The NLP component 108 can determine that the input audio signal corresponds to a request to invoke, launch or active an application 118.

The NLP component 108 can filter the input audio signal to identify the keywords, search query, or trigger keyword. For example, the data packets carrying the input audio signal can include "It would be great if I could get someone that could help me go to the airport", in which case the NLP component 108 can filter out one or more terms as follows: "it", "would", "be", "great", "if", "I", "could", "get", "someone", "that", "could", or "help". By filtering out these terms, the NLP component 108 may more accurately and reliably identify the trigger keywords, such as "go to the airport" and determine that this is a request for a taxi or a ride sharing service.

Based on processing or parsing the input audio signal, the NLP component 108 can identify an application 118 to invoke, launch, open, or otherwise activate. The NLP component 108 can identify the application 118 based on parsing the input audio signal to identify the terms, keywords, trigger keywords or phrases. The NLP component 108 can perform a lookup in index 126 using the identified terms, keywords, trigger keywords or phrases to identify the application 118. In some cases, the keyword can include an identifier of the application 118, such as "Application_Name_A" or "Application_Name_B". In some cases, the keyword can indicate a type or category of application 118, such as ride sharing application, restaurant booking application, movie ticket application, news application, weather application, navigation application, streaming music application, streaming video application, restaurant review application, or other type or category of application 118.

If the input audio signal includes an identifier corresponding to the application, such as an alphanumeric identifier, the NLP component 108 can perform a lookup in the index 126 with the alphanumeric identifier to identify the application 118, and provide the indication to the application manager component 114 for activation. The indication can include a unique identifier, reference, pointer, link, or deeplink for the application 118. If the input audio signal includes an indication of a type or category of the application 118, the NLP component 108 can perform a lookup in the index 126 with the type or category of application 118 to identify if there is a corresponding application 118 installed on the computing device 128. For example, if the category or type of application is a restaurant reservation booking application, the index 126 can include a reference or identifier for an application associated with this category, such as "Restaurant_Booking_App." If the input audio signal includes a query or request, the NLP component 108 can determine the type of query or request, and then identify an application 118 in index 126 that is configured or capable of fulfilling the query or request. In some cases, the NLP component 108 can communicate with the remote data processing system 142 to identify and select the application responsive to the input audio signal.

In the even the digital assistant component 106, using index 126, is unable to identify an application 118 that is installed on the computing device 128 that can fulfill the input query or request, the digital assistant component 106 can generate an alert or prompt. The alert or prompt can indicate that the application is not installed and the digital assistant component 106 cannot fulfill the request or query. In some cases, the prompt can include an indication of an application 118 that is configured to fulfill the query or request, but not installed on the computing device 128, or not otherwise accessible to the computing device 128. The prompt can include a reference to a resource that can provide the application 118 for installation on the computing device 128.

The NLP component 108 can use one or more models 110 and techniques 112 to process the input audio signals. Models 110 can refer to or include machine learning models 110 that are trained based on data. Models 110 can include various weights or configurations to facilitate performing natural language processing or understanding. The model 110 can include, for example, certain weights, calibrations, or configurations to facilitate performing natural language understanding. The model 110 can be calibrated to more likely detect a certain type of term. For example, if the NLP component 108 detects that the input request is to activate an application, the NLP component 108 can use a model 110 having a list of all applications installed on the computing device 128 (e.g., index 126). The NLP component 108 can determine which application from the list of applications corresponds to the input request. By using a model 110 with a limited set of applications that are installed on the computing device 128, as compared to the set of all applications that may be provided by an online application marketplace, the NLP component 108 can improve the likelihood of accurately detecting the requested application 118. Further, by using the model 110 with the limited set of applications 118 installed on the computing device as compared to the set of all applications, the NLP component 108 can reduce computing resource utilization (e.g., using a smaller model 110 may occupy less memory and use less processing), while improving accuracy and reliability of identifying the application.

The NLP component 108 can use one or more techniques 112 to parse or process the input audio signal. Techniques 112 can include rule-based techniques 112 or statistical techniques 112. Techniques 112 can utilize machine learning or deep learning. Example techniques 112 can include named entity recognition, sentiment analysis, text summarization, aspect mining, or topic mining. Techniques 112 can include or be based on text embeddings (e.g., real values vector representations of strings), machine translation (e.g., language analysis and language generation), or dialogue and conversations (e.g., models used by artificial intelligence). Techniques 112 can include determine or leverage syntax techniques (e.g., arrangement of words in a sentence based on grammar) such as lemmatization, morphological segmentation, word segmentation, part-of-speech tagging, parsing, sentence breaking, or stemming. Techniques 112 can include determine or leverage semantics techniques such as named entity recognition (e.g., determining the parts of the text that can be identified and categorized into present groups such as names of application 118, people or places), word sense disambiguation, or natural language generation. Thus, the NLP component 108 can receive a first input audio signal detected by a microphone (sensor 136) of the client computing device 128, and process, via a natural language processing technique 112, the first input audio signal to identify an indication of an application.

The computing device 128 (or digital assistant component 106) can include an application manager component 114 designed, constructed and operational to activate an application 118. The application manager component 114 can receive the indication of the application 118 identified by the NLP component 108. The application manager component 114 can receive an alphanumeric identifier, or other reference or indication of the application 118. The application manager component 114 can perform a lookup in index 126 to verify that the application 118 is available or compatible for activation on the computing device 128. The application manager component 114 can activate the application 118. Activating the application 118 can refer to or include bringing the application 118 to a foreground of the computing device 128. Activating the application 118 can refer to executing the application. Activating the application 118 can refer to bringing the application to a foreground process from a background process. The application manager component 114 can generate a command, script, process or other instruction to invoke, launch or otherwise activate the application 118.

The application manager component 114 can perform a lookup in an index 126 of the client computing device 128 to determine the application 118 is installed on the client computing device 128. The application manager component 114 can activate, responsive to the determination the application 118 is installed on the client computing device 128, the application 118.

Launching the application 118 can cause the application to declare information to the digital assistant component 106. The application 118 can declare a function the application 118 is configured to perform. Declaring a function the application 118 is configured to perform can include providing an indication of the types of parameters or types of parameters the application 118 can receive as input in order to perform a function or task. The application 118 can declare a state of the application 118, such as a current state. The application 118 can declare a current context of the application 118. The application 118 can declare the types of functions the application 118 can perform, the types of inputs used to perform the function, or other information or data that facilitates the application 118 performing a task or executing an action.

For example, the application 118 can include an application to make a reservation at a restaurant. The first input audio signal can include a query or request to make a reservation, such as "Make a reservation using Restaurant_ Booking_App_1." The NLP component 108, using a NLP technique 112 and model 110 (e.g., a model 110 configured with applications installed on the computing device 128), can identify the application 118 and the application manager component 114 can activate the application 118 (e.g., Restaurant_Booking_App_1).

The application 118 can declare information using a protocol 150. The protocol 150 can include a two-way communication protocol. The protocol 150 can include, for example, a transport protocol, a TCP/IP protocol, an inter-process communication protocol, a messaging protocol, or any other communication technique. The protocol 150 can include an inter-process communication protocol, through which the application 118 can declare functions or intents supported by the application 118, a parameter-type and supported-parameter-values for the intents or functions. For example, a function "BOOK A TABLE" may have a TableType parameter and a BookingTime parameter. The TableType parameter can be associated with values WindowSide or LakeSide. The BookingTime parameter can be associated with a type "Time". The digital assistant component 106 can receive this information via the protocol 150 in order to modify the processing done by the NLP component 108 to improve NLP understanding and determine a fulfillment for the user query. That digital assistant component 106 can send the fulfillment back to the application 118 using the same protocol 150 (e.g., "set TableType=LakeSide").

The application 118 can declare the information using an API, for example a direct action API, or software development kit ("SDK"). The application 118 can be configured with an API or SDK to interface with the digital assistant component 106 via interface 104. The application can use interface 104 to communicate with one or more component of the digital assistant component 106, and the digital assistant component 106 can use the interface 104 to communicate with the application 118.

The application 118 can be configured with declarations 120. A developer of the application 118 can provide declarations 120. The application 118 can be constructed, designed and operational to determine a current state of the application 118. The state of the application 118 can refer to what inputs the application 118 is currently capable of receiving. The state of the application 118 can refer to what action the application 118 is capable of performing. The state of the application 118 can refer to what function the application 118 is capable of performing. Thus, the state of the application 118 can refer to, include, or be based on inputs the application 118 can receive, functions the application 118 can perform, or actions the application 118 is configured to execute.

Example declarations can include functions, actions, a format for input values, types of input values, categories or types of text, names, semantic information, numeric values, or other information that facilitates detecting input parameters in voice input. The application 118 can declare that the application 118 is expecting to receive a query, a request, an instruction, or command. The application 118 can declare that the application 118 is expecting to receive a numerical value or a word, phrase, proper noun, geographic location, zip code, state, city, or town. The declaration 120 can include points of interests. The declarations 120 can include currency. Thus, the application 118 can be configured to provide declarations 120 related to what function the application 118 is capable of performing, or a current context or state of the application 118, which can indicate what input parameters the application 118 is currently capable of receiving and processing to perform the function or action. Example functions can include making a reservation at a restaurant, making a booking at a hotel, booking a flight, renting a car, purchasing goods or services, ordering takeout food, ordering a ride share, or ordering a taxi.

For example, the application 118 can be designed, constructed and operational to make a reservation at a restaurant. Upon being launched, invoked or otherwise activated, the application 118 can enter a state. The application 118 can enter a default or home state. In this default, home or initial state, the application 118 can include an input text box. The input text box can be an input search box configured to receive a query. The query can include a query for a type of restaurant, location, or name of a restaurant. Thus, the current state of the application 118 can indicate that the application 118 is capable of receiving an input query in a search field of the user interface of the application 118.

The application 118 can declare, to the NLP component 108 via protocol 150, that the function the application 118 can perform includes making a reservation at a restaurant. In some cases, the application 118 can declare what types of inputs the application 118 can receive to perform the function, such as input queries related to searching for a restaurant. The application 118 can further declare a type or format for the input, such as a keyword, text, names, categories or types of restaurants, or name of a restaurant. By declaring to the NLP 108 that the application 118 can perform the function of making a reservation at a restaurant, or is expecting to receive a name of a restaurant, the NLP 108 can modify a model 110 or technique 112 of the NLP 108 to improve the likelihood, accuracy and reliability of detecting input information in a voice input that facilitates the application 118 performing the function of making a reservation at the restaurant.

The NLP component 108 can modify the natural language processing technique 112 or model 110 responsive to the function declared by the application. The NLP component 108 can perform a dynamic real-time modification or update to the NLP processing technique 112 or model 110. The NLP component 108 can perform a declaration-based real-time update of the NLP technique 112 or model 110. The NLP component 108 can use the declarations to perform real-time natural language understanding based on a state or context of the third-party application. Real-time can refer to updating the NLP processing responsive to activation of the application. Real-time can refer to updating the NLP processing subsequent to activation of the application and prior to receiving a second audio input signal. Real-time can refer to updating the NLP processing technique within 1 second of activating the application 118, 2 seconds of activating the application 118, 3 seconds of activating the application 118, 5 seconds of activating the application 118, 10 seconds of activating the application 118, 15 seconds of activating the application 118, or 30 seconds of activating the application 118, for example.

In some cases, the model 110 can be updated based on the function, and the NLP technique 112 can use the updated model 110. The NLP component 108 can provide the updated model 110 to the NLP technique 112. The NLP component 108 can select a type of model 110 or technique 112 based on the declaration. The NLP component 108 can select a model 110 or technique that is tuned or calibrated to detect input parameters for the function declared by the application 118 in a subsequent input audio signal. For example, if the declaration indicates that the function the application 118 performs uses an input that includes a geographic area, then the NLP component 108 can select a model 110 or technique 112 that is calibrated, optimized or tuned to detect geographic areas, such as states, cities, towns, squares, or other geographic areas. For example, the NLP component 108 can select a dictionary for the declared function. In another example, the model 110 can be tuned to weight terms that correspond to the declared more heavily, as opposed to numerical values. In another example, the technique 112 can be optimized to detect geographic areas as opposed to numerical values or semantic processing. Thus, the digital assistant component 106 can modify, subsequent to activation of the application 118 and based on the function declared by the application 118, the natural language processing technique 112 to increase a likelihood of detection of the one or more parameters relative to the natural language processing technique 112 not modified based on the function (e.g., using the updated technique 112 or the technique 112 using the updated model 110 can provide an improvement to accuracy and reliability or likelihood of detecting input parameters for the function relative to using a default technique 112 or default model 110 to detect input parameters).

In another example, if the declared function includes making a reservation at a restaurant, then the NLP component 108 can select a model 110 or technique that is optimized to detect nouns, such as names of restaurants. Thus, based on the function declared by the application, the NLP component 108 can select a model 110 or technique 112 that is calibrated, tuned, optimized or otherwise constructed to more reliably detect an input parameter used to execute or perform the function, such as proper nouns, numbers, words, phrase, question, numeric values, monetary amounts, or geographic locations.

The digital assistant component 106 (e.g., via NLP component 108) can receive a second input audio signal detected by the microphone (e.g., sensor 136) of the computing device 128. The digital assistant component 106 can process, via the modified natural language processing technique 112 or model 110, the second input audio signal to detect one or more parameters that correspond to the function declared by the application 118. The NLP component 108 can use the state information declared by the application 118 (e.g., a declaration indicating a function the application 118 can perform in a current state) to perform real-time natural language processing of the second input audio signal to identify the one or more parameters. Performing real-time natural language processing can refer to processing the second input audio signal using the current contextual information declared by the application 118 to modify or update an NLP technique 112 or model 110 to process the input signal to detect an input parameter.

The digital assistant component 106 can determine, based on a comparison between the one or more parameters and the function declared by the application, that the one or more parameters are compatible for input into an input field of the application 118. The digital assistant component 106 can determine that the detected input parameters are compatible with the declared function. The digital assistant component 106 can use a policy, matching technique or other technique to determine compatibility. The digital assistant component 106 can compare the type of input parameter with the type of input parameter the function is configured to receive. The types can include, for example, numeric values, geographic locations, proper nouns, questions, words, or phrases. Types can include or be based on semantics, such as a meaning of the input parameters. Types can include or be based on syntax, such as a format or grammar of the input parameter. For example, the input parameter can be a geographic location. The digital assistant component 106 can determine the input parameter is a geographic location, such as an address, and then compare the type "address" with the types of input values configured for the declared function to determine a match or compatibility.

In another example, the digital assistant component 106 can determine compatibility based on the number of input parameters, a range of possible input values, or a consistency between multiple input parameters.

In some cases, the digital assistant component 106 can determine compatibility using a template. The digital assistant component 106 can identify a template associated with the declared function. The template can indicate types of input parameters, a number of input parameters, semantics and syntax associated with input parameters, or any other information associated with expected input parameters. The digital assistant component 106, using the template, can determine whether the detected input parameters are compatible. For example, if the template indicates that the expected input parameters is a geographic location or address, but the detected input parameter is a type of product, then the digital assistant component 106 can determine an incompatibility between the input parameters and the declared function. Responsive to determining an incompatibility, the digital assistant component 106 can determine not to create an action data structure with the incompatible detected input parameter. The digital assistant component 106 can determine not to input the incompatible parameter into the application 118 as it may result in a malfunction or error in the application 118, or undesired result. Thus, by detecting an incompatibility and not inputting the erroneous input parameter, the digital assistant component 106 can reduce or prevent errors and wasted computing resource utilization. In some cases, responsive to detecting the error, the digital assistant component 106 can generate a prompt or alert requesting a compatible input parameter.

The NLP component 108 can receive state information declared by the application 118 via the protocol 150. The NLP component 108 can map, via the modified natural language processing technique 112 (or model 110), the second input audio signal to the state information to identify a request. For example, the state information can indicate that the application 118 is in a ready state and open to receiving a request to perform a type of action. The types of action can range from performing a search for a restaurant, being added to a wait list at a restaurant, making a reservation at a restaurant, or leaving a review for a restaurant. The application can declare the types of available actions to the NLP component 108. The NLP component 108 can than parse the second input audio signal to determine a request for leaving a review for a restaurant (e.g., "leave Restaurant_A 5 stars"). The NLP component 108, using the technique 112 or model 110 tuned to more reliably and accurately detect this is a request to leave a review based on the declared state information indicating that leaving reviews is one of the compatible requests, can detect that this is a request to leave a review for this restaurant. The NLP component 108 can detect this request, and then provide the detected input parameters, including the type of function (e.g., review), the name of the restaurant being reviewed (e.g., Restaurant_A), and what the review or rating is (e.g., 5 stars). The direct action API 116 can generate an action data structure comprising these three input parameters. Thus, the digital assistant component 106 can prevent or avoid the need for multiple dialogs or screens in order to execute this action by using a NLP component 108 that can modify NLP techniques 112 or models 110 in real-time based on the declared context or state of the activated application 118.*d*

The digital assistant component 106 can include a direct action API 116 designed and constructed to generate, responsive to the determination of compatibility and based on the one or more parameters, an action data structure for the application 118. The direct action API 116 can input the action data structure into the application 118 via the protocol 150 to cause the application 118 to execute the action data structure and update a user interface element of the application 118. Processors of the computing device 128 can invoke the direct action API 116 to execute scripts that generate a data structure to an application 118 to request or order a service or product, such as a car from a car share service or making a reservation at a restaurant. The direct action API 116 can obtain data from the NLP component 108 as well as the data repository 122, as well as data received with end user consent from the client computing device 128 to determine location, time, user accounts, logistical or other information to allow the application 118, in communication with a 3P application server 148, to perform an action or operation, such as make a reservation at a restaurant or reserve a car from the car share service. Using the direct action API 116, the digital assistant component 106 can also communicate with the 3P application server 148 to complete the conversion by in this example making the reservation or making the car share pick up reservation.

The direct action API 116 can execute a specified action to provide input to the application 118 to cause the application to execute the action to perform the function declared by the application 118. Depending on the action specified in its inputs, the direct action API 116 can execute code or a dialog script that identifies the parameters required to fulfill the function or a user request. Such code can look-up additional information, e.g., in the data repository 122, such as the name of a home automation service, or it can provide audio output for rendering at the client computing device 128 to ask the end user questions such as the intended destination of a requested taxi. The direct action API 116 can determine necessary parameters and can package the information into an action data structure, which can then be sent to the application 118 for execution.

The direct action API 116 can receive an instruction or command from the NLP component 108, or other component of the digital assistant component 106, to generate or construct the action data structure. The direct action API 116 can determine a type of action in order to select a template stored in the data repository 122. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from a template repository stored in data repository (e.g., stored in applications 124 data structure or database). Templates can include fields in a structured data set that can be populated by the direct action API 116 to further the operation that is requested of the 3P application server 148 (such as the operation of sending a taxi to pick up an end user at a pickup location and transport the end user to a destination location). The direct action API 116 can perform a lookup in the template repository (e.g., stored in applications 124 data structure or database) to select the template that matches one or more characteristic of the declared function. For example, if the declared function corresponds to requesting a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 136 of the computing device 128 or a user interface of the computing device 128. For example, the direct action API 116 can detect the source location using a location sensor, such as a GPS sensor. The direct action API 116 can obtain further information by submitting a survey, prompt, or query to the end of user of the computing device 128. The direct action API can submit the survey, prompt, or query via interface 104 of the data processing system 102 and a user interface of the computing device 128 (e.g., audio interface, voice-based user interface, display, or touch screen). Thus, the direct action API 116 can select a template for the action data structure based on the trigger keyword or the request, populate one or more fields in the template with information detected by one or more sensors 136 or obtained via a user interface, and generate, create or otherwise construct the action data structure to facilitate performance of an operation by the 3P application server 148.

The data processing system 102 can select a template based from a template data structure stored in data repository 122 (e.g., stored in applications 124 data structure or database) based on various factors including, for example, one or more of the declarations from the application, keyword, request, 3P application server 148, type of application, a category that the application 118 falls in (e.g., taxi service, laundry service, flower service, reservations, or food delivery), location, or other information.

To select the template based on the declarations, the data processing system 102 (e.g., via direct action API 116) can perform a look-up or other query operation on the template database (e.g., stored in applications 124 data structure or database) in the data repository using the declarations or input parameters from the application 118 to identify a template data structure that maps or otherwise corresponds to the declarations or input parameters. For example, each template in the template database can be associated with one or more declarations to indicate that the template is configured to generate an action data structure responsive to the declaration that the application 118 can process to execute the action. In some cases, the data processing system 102 can identify a type of application 118 based on information in the index 126 or applications 124.

To construct or generate the action data structure, the data processing system 102 can identify one or more fields in the selected template to populate with values detected by the NLP component 108 in the input audio signal using the updated or modified NLP technique 112 or model 110. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by parsing or processing input audio signals using an updated or modified NLP technique 112 or model 110. In some cases, the data processing system 102 can determine values from other sources, such as the data repository 122 or sensors 136. For example, the data processing system 102 can acquire or obtain the information by querying or polling one or more available sensors of the client computing device 128, prompting the end user of the client computing device 128 for the information, or accessing an online web-based resource using an HTTP protocol. For example, the data processing system 102 can determine that it does not have the current location of the client computing device 128, which may be a needed field of the template. The data processing system 102 can query the client computing device 128 for the location information. The data processing system 102 can request the client computing device 128 to provide the location information using one or more location sensors 136, such as a Global Positioning System sensor, WIFI triangulation, cell tower triangulation, Bluetooth beacons, IP address, or other location sensing technique.

The direct action API 116 can use the protocol 150 to input action data structure into the application 118. The direct action API 116 can input the action data structure via a user interface of the application 118 or other interface of the application 118. The direct action API can input the action data structure via interface 104. The direct action API can input the action data structure via a headless interface of the application 118. The application 118, upon receiving the action data structure, can execute the action data structure to perform the action or function.

The digital assistant component 106 can receive additional declarations from the application 118. After inputting action data structure into the application 118, the current state of the application 118 can change based on processing or executing the action data structure. The application 118 can provide an updated or new declaration responsive to executing the action data structure and changing a state of the application. The new or update declaration can indicate a current state of the application subsequent to receipt of the action data structure, execution of the action data structure, or partial execution of the action data structure. The update declaration can indicate a change to the user interface, such as additional input fields in the user interface. The NLP component 108 can modify (e.g., re-modify or modify again), responsive to the indication of the change to the state, the natural language processing technique 112 or model 110 that previously modified responsive to the function declared by the application. The type of modification can be similar to the first modification, but adapted to the new declarations (e.g., declared new function or input used to perform a new function, or request for additional input to facilitate performance of the original function or action). The digital assistant component 106 can receive a third input audio signal subsequent to the re-modification of the NLP technique 112 or model 110. The NLP component 108 can process, via the natural language processing technique 112 (e.g., a modified technique 112 or the same technique 112 using a modified or different model 110) that was modified responsive to the indication of the change to the state, the third input audio signal to identify a second one or more parameters. The data processing system 102 can generate a second action data structure based on the second one or more parameters.

In some cases, the application 118 can invoke the digital assistant component 106. For example, the application 118 can provide an indication of a change to a state of the application 118. The application 118 can provide the indication via the protocol 150. The application 118 can provide a declaration that indicates a change to a state of the application 118, or a request for input or a request for an action data structure. The declaration can indicate that the application 118 is in a ready state or available to execute an action data structure. This indication or declaration can invoke the digital assistant component 106. For example, the indication can wake-up the digital assistant component 106 to cause the digital assistant component to detect or process an input audio signal. The invocation of the digital assistant component 106 can refer to or include by-passing the hotword or wake-up word the pre-processor 130 detects. The invocation can cause the digital assistant component 106 to generate a prompt or output, such as an audio output that requests input from a user of the computing device 128.

The invocation can cause the digital assistant component 106 to parse a current user interface of the application 118 to determine a context of the application or contextual information of the application or a current state of the application. In addition to determine the state or context of the application based on the declarations from the application 118, the digital assistant component 106 (e.g., via application manger component 114) can parse the user interface (e.g., a graphical user interface) of the application 118 to determine the state of the application. Determining the state of the application 118 can refer to or include determining the types of inputs the application 118 is capable of receiving, a change to the available inputs, or the types of actions or functions the application 118 is capable of performing. The application manager component 114 can parse the current user interface of the application 118 responsive to the indication of the change to identify one or more input fields provided via the user interface element of the application 118. The digital assistant component 106 can receive an input audio signal (e.g., a third input audio signal) after being invoked by the application 118 by the declaration sent via the protocol 150. The digital assistant component 106 can process the third input audio signal using the natural language processing technique based on the declared one or more input fields to identify a second one or more parameters of the third input audio signal for input into the application 118 responsive to the change to the state of the application 118.

The digital assistant component 106 can receive an indication that the application is deactivated. Deactivation can refer to the application 118 exiting, being closed, being disabled, being turned off, being removed or uninstalled, entering a standby state, becoming a background process (e.g., no longer being actively used in the foreground), or a different application going into the foreground or becoming a foreground process. Deactivation of the application 118 can indicate that the application 118 is not the primary application that is currently being used, or no longer the primary application being used or executed on the computing device 128.

The digital assistant component 106 can return the modified natural language processing technique to a default natural language processing technique. The digital assistant component can return the modified NLP technique 112 or model 110 to the default or initial techniques 112 or models 110 responsive to deactivation of the application 118. The digital assistant component 106 can remove, from the natural language processing technique 112 (or model 110), the modification that was made to the technique 112 or model 110 based on the function that the application 118 declared to the digital assistant component 106. The digital assistant component 106 can revert the NLP to a previous state or default state. The digital assistant component 106 can delete the modifications or adjustments that were made. The digital assistant component 106 can deactivate the modified techniques 112 or models 110, but store them in data repository 122 for future use. The digital assistant component 106 can reset the techniques 112 or models 110 to an initial state or default state to facilitate NLP on subsequent input audio signals that are no longer providing input to the application 118 because the application 118 has been deactivated. By resetting the NLP, the digital assistant component 106 can prevent or reduce erroneous or inaccurate NLP by not using a technique 112 or model 110 that is tuned or calibrated for a particular function declared by the application 118. The NLP can revert to using techniques 112 or models 110 that are tuned for generally detecting queries or inputs, as opposed to a technique 112 or model 110 that is tuned to detecting a particular query or input for a function of the application 118.

The digital assistant component 106 can transmit a request for content to the remote data processing system 142. The digital assistant component 106 can transmit the request for content based on, or responsive to, the action data structure, a function declared by the application 118, declarations 120, the modified NLP technique, one or more parameters detected in a second input audio signal and using the modified NLP technique, or the updated user interface element of the application. For example, the request can include information about the function declared by the application 118, declarations 120, the modified NLP technique, one or more parameters detected in a second input audio signal and using the modified NLP technique, or the updated user interface element of the application. The request can include or provide, to the remote data processing system 142, the type of function or name of the function. The request can include or provide, to the remote data processing system 142, the declarations 120. The request can include or provide, to the remote data processing system 142, an indication of how the NLP is modified such as the weights applied to the NLP technique or the type of NLP technique being used. The request can include or provide to the remote data processing system 142 information about parameters or values detected in the second input audio signal using the modified NLP processing technique. The request can include or provide, to the remote data processing system 142, information about the user interface element of the application such as a content item slot (e.g., size or position for a content item slot in which a content item is to presented via a visual display, or a duration of the slot such as a time duration for an audio or video content item). Thus, generating the request based on information can refer to or include generating the request with the information. In some cases, generating the request based on the updated user interface element of the application can include generating the request responsive to identifying an available content slot in the user interface element of the application.

In some cases, the application 118 can generate the request for content and directly transmit the request for content to the remote data processing system 142. The application 118 can generate the request for content responsive to input of the action data structure. The application 118 can generate the request for content and transmit the request to the digital assistant component 106 to transmit, forward or convey the request to the remote data processing system 142.

The content selector component 146 of the remote data processing system 142 can select content items (e.g., digital component objects) based on the request or responsive to the request. The content selector component 146 can select content items based on, or responsive to, the action data structure, a function declared by the application 118, declarations 120, the modified NLP technique, or the updated user interface element of the application. The content selector component 146 can input information associated with the action data structure, a function declared by the application 118, declarations 120, the modified NLP technique, parameters or values detected in an input audio signal using the modified NLP technique or the updated user interface element of the application into a real-time content selection process. The content selector component 146 can select a content item that is relevant or otherwise matches information associated with the action data structure, the application, a function declared by the application 118, declarations 120, the modified NLP technique, parameters or values detected in an input audio signal using the modified NLP technique parameters or values detected in an input audio signal using the modified NLP technique, or the updated user interface element of the application. For example, if the application is an e-commerce application that sells shoes, then the content selector component 146 can select a content item for a type of sneaker. In another example, if the second input audio signal that is detected using the modified input audio signal includes a parameter or value for a type of restaurant or type of table in a restaurant, then the remote data processing system 142 can select a content item related to restaurants (e.g., a coupon for a restaurant).

The remote data processing system 142 can provide the selected content item to the digital assistant component 106 for presentation. The remote data processing system 142 can provide the selected content item to the application 118 for presentation. The remote data processing system 142 can provide the selected content item to the digital assistant component 106 to provide to the application 118 for presentation. The content item can be presented via the user interface of the application 118, such as in a visual content slot or audio output.

The digital assistant component 106 can present the content item separately or independently from the application 118. For example, the digital assistant component 106 can invoke a separate user interface, such as a pop-up window or banner content for display via the display device 134 of the computing device 128. In some cases, the digital assistant component 106 can provide the content item as audio output. The audio output can be presented prior to, during, or subsequent to audio output of the application 118. In the event the application 118 is not providing audio output, the digital assistant component 106 can provide the content item via audio output independent of the interface used by the application. Thus, the data processing system 102 can present the content item via a user interface of the digital assistant component 106 (e.g., an audio interface) or the application 118 (e.g., a graphical user interface).

Figure 2:
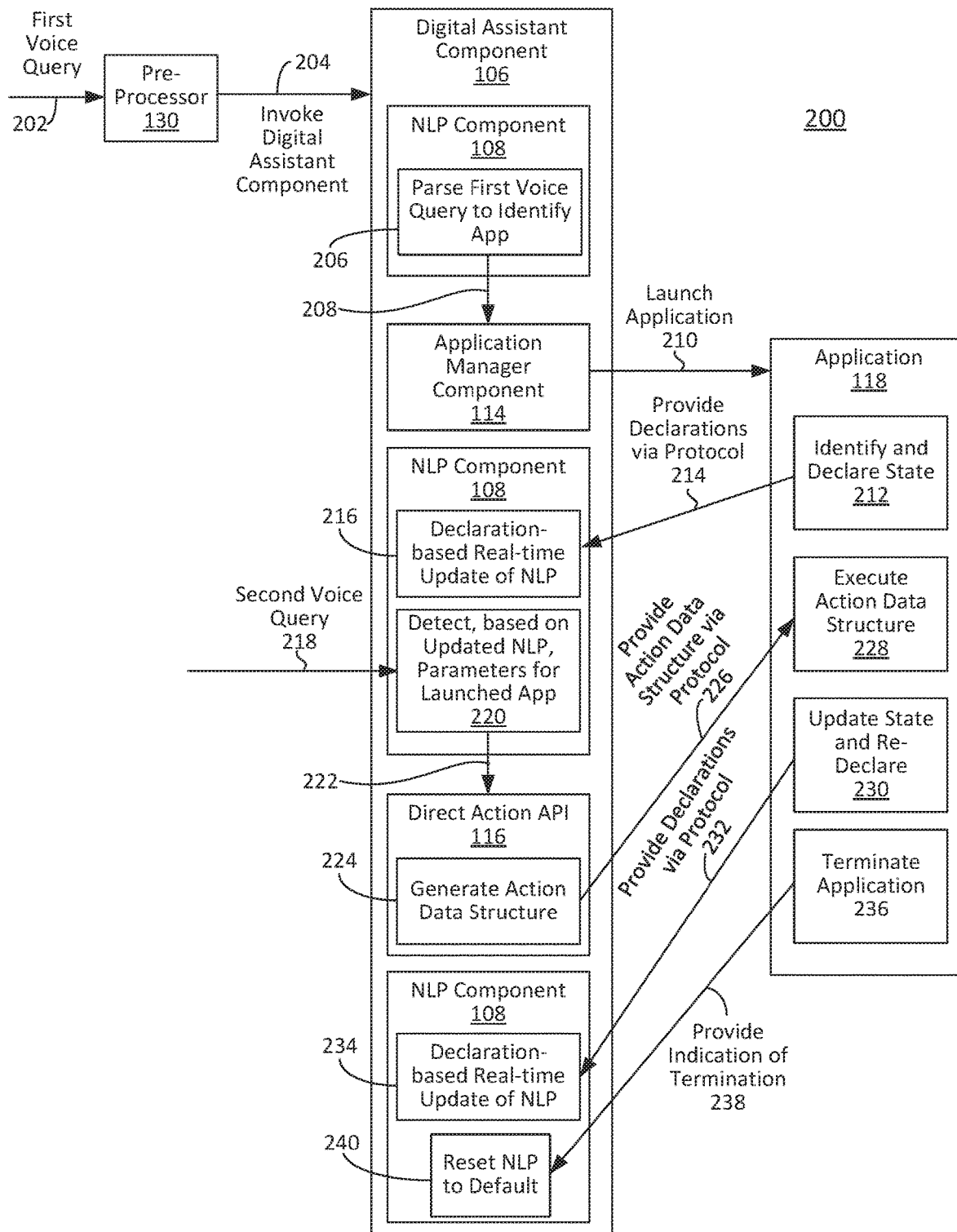
FIG. 2 is an illustration of an operation of a system to dynamically interface with applications, in accordance with an implementation.

FIG. 2 is an illustration of an operation 200 of the system 100 to dynamically interface with applications. The system can include one or more component of system 100 depicted in FIG. 1 or system 400 depicted in FIG. 4. In the operation 200, at ACT 202, the pre-processor 130 (e.g., executed by the computing device 128) can receive or detect a first voice query. The first voice query can include an input audio signal. The pre-processor 130 can detect a trigger keyword, hotword, wake-up word, alert or other indication to invoke a digital assistant component 106. The pre-processor 130, responsive to detecting the wake-up word, can invoke the digital assistant component 106 at ACT 204.

At ACT 206, the NLP component 108 of the digital assistant component 106 can parse the first voice query to identify an application. The NLP component 108 can use one or more NLP techniques or models to identify the application. The NLP component 108 can provide the indication of the application to the application manager component 114 at ACT 208. The Application manager component 114 can determine the application 118 is installed on the computing device 128 or otherwise accessible to the computing device 128. The application manager 114 can launch or activate the application 118 at ACT 210.

At ACT 212, the application 118 can identify a state of the application 118. For example, the application 118 can identify a current user interface, graphical user interface, or functions the application 118 can perform, or input fields of the user interface. The application 118 can provide declarations of the state of the application 118 at ACT 214 to the digital assistant component 106 via a protocol 150.

At ACT 216, the NLP component 108 can perform a declaration-based real-time update of the NLP. A declaration-based real-time update of the NLP can refer to updating, modifying, or otherwise tuning or calibrating an NLP technique 112 or model 110 to improve the accuracy and reliability with which the NLP component 108 can detect input parameters in subsequent input audio signal that are compatible with the function declared by the application 118.

At ACT 218, the digital assistant component 106 can receive a second voice query 218. A pre-processor 130 can receive the second voice query and provide the second voice query to the digital assistant component 106. In some cases, the digital assistant component 106, having been invoked previously by the pre-processor 130, can remain in an active state and directly receive and parse the second voice query at ACT 220. The NLP component 108, at ACT 220, can detect parameters for the activated or launched application 118. At ACT 222, the digital assistant component 106 can provide the detected parameters to a direct action API 116. At ACT 224, the direct action API 116 can generate an action data structure with the input parameters using a template or other technique.

At ACT 226, the direct action API 116 can provide the action data structure for input into the application 118. At ACT 228, the application 118 can execute the action data structure. The application 118 can perform the action or otherwise process the received action data structure to change or update a state of the application. The action data structure can cause a change in the state of the application 118. At ACT 230, the application 118 can update a state, and then declare the update state. The application 118 can re-declare the state of the application in order to provide the current state information or context to the digital assistant component 106. At ACT 232, the application can provide declarations corresponding to the updated state via a protocol. At ACT 234, the NLP component 108 can receive the declarations from ACT 232 and perform a declaration-based real-time update of an NLP technique 112 or model 110.

The application 118 can terminate at ACT 236. The application 118 can deactivate or enter a standby state at ACT 236. A user can close or minimize or hide the application 118 at ACT 236. The application 118 (or application manager component 114) can provide an indication of the deactivation or termination at ACT 238. The application manager component 114 can detect the application 118 has been deactivated. At ACT 240, the NLP component 108 can reset the NLP technique 112 or model 110 to a default state so as not to use the NLP modified for the declared function of the application 118 to process input audio signals received subsequent to termination of the application 118.

Figure 3:
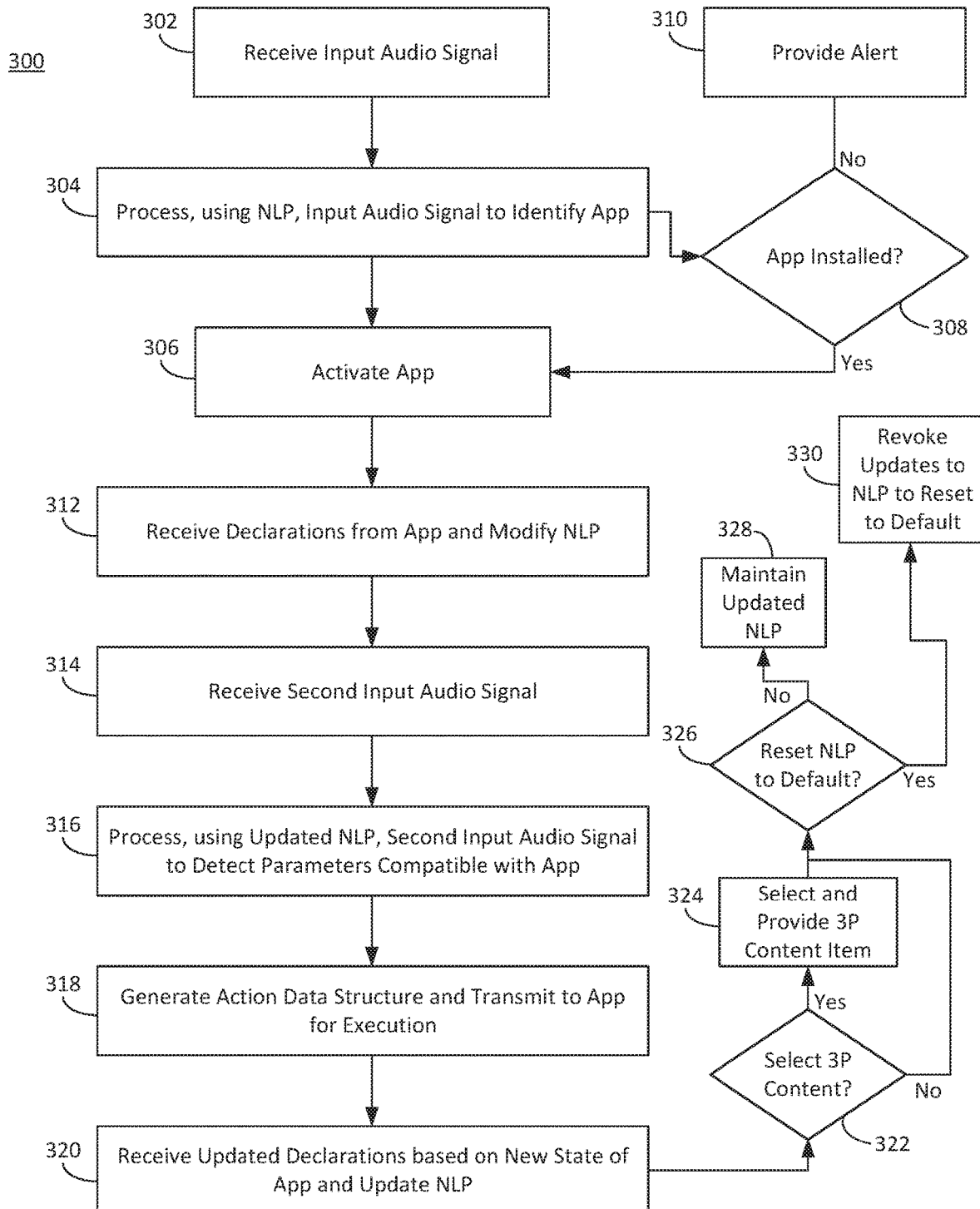
FIG. 3 is an illustration of a method of dynamically interfacing with applications, in accordance with an implementation.

FIG. 3 is an illustration of an example method for dynamically interfacing with applications. The method 300 can be performed by one or more component, system or element of system 100 or system 400, including, for example, a computing device, a data processing system, digital assistant component, NLP component, direct action API, or application manager component. The method 300 can include receiving an input audio signal at 302. The input audio signal can be received via an interface of a data processing system. The input audio signal can be detected by a microphone of a client computing device. The input audio signal can include a voice query, instruction or command from a user of the computing device.

At ACT 304, the data processing system can process, using NLP, the input audio signal to identify an application. The data processing system can identify the application based terms, keywords or other information in the input audio signal. At decision block 308, the data processing system can determine whether the application is installed on the computing device or is otherwise accessible to the computing device. The data processing system can determine whether the computing device (or account thereof) is authorized to access or use the application. If, at decision block 308, the data processing system determines the application is not authorized, the data processing system can proceed to ACT 310 to provide an alert. The alert can include an indication to download and install the application, an indication the application is not available, or an indication to make another request.

If, at decision block 308, the data processing system determines the application is installed, the data processing system can proceed to ACT 306 to activate the application. The data processing system can launch, invoke, or otherwise bring the application to the foreground. In some cases, the data processing system can execute the application in a headless state in which the application may not present a graphical user interface element for display on a display device of the computing device. For example, the data processing system can execute the application in a voice-only mode or for interfacing via audio input and audio output. In some cases, the data processing system can activate the application in a hybrid mode, in which the application can provide output via a graphical user interface, while receiving input via a voice-based interface via the digital assistant component. Activating the application at ACT 306 can cause the application to declare a current state of the application.

At ACT 312, the digital assistant component executed by the data processing system can receive declarations from the activated application and modify an NLP. The digital assistant component can perform a declaration-based real-time update of an NLP technique or model. The digital assistant component can update the NLP responsive to the declarations received from the application.

At ACT 314, the data processing system can receive a second input audio signal. The digital assistant component can receive the second input audio signal from a user of the computing device, such as voice input. The second input audio signal can be a continuation of the first input audio signal. At ACT 316, the data processing system can process the second input audio signal using the updated NLP to detect input parameters that are compatible with the application (e.g., an input field of the current state of the application or function of the application). The digital assistant component can determine, based on a comparison between the one or more parameters and the function declared by the application, that the one or more parameters are compatible for input into an input field of the application activated by the digital assistant on the client computing device.

At ACT 318, the digital assistant component can generate an action data structure based on the detected input parameters or request. The digital assistant component can generate the action data structure responsive to determining the input parameters are compatible with the function or state of the application. The digital assistant component can provide the action data structure for input into the application. The application can execute the action data structure.

At ACT 320, the digital assistant component can receive an updated declaration based on the new state of the application responsive to execution (or partial execution) of the action data structure. The digital assistant component can update the NLP based on the new declarations.

At decision block 322, the data processing system can determine whether to select 3P content. 3P content can refer to digital component objects, such as content items, images, video content item, or audio content item. Digital component objects can refer to or include an advertisement. The digital assistant component can determine whether to select 3P content based on a policy, preference or configuration. For example, the application can provide an indication, via a declaration, that a content slot is available in the application and configured for a 3P content item. The declaration can include the type of content slot (e.g., audio content slot, text content slot, image content slot, video content slot, pop-up window content slot, or banner content slot). In some cases, the computing device can include a profile or preference as to whether to allow 3P content to be provided. In some cases, the digital assistant component can determine whether to select 3P content based on the type of function or current state of the application. For example, if the application function relates to navigation, then the digital assistant component can determine not to select content. If the function is related to making a reservation for a restaurant, then the digital assistant component can determine to select 3P content.

If the digital assistant component determines to select 3P content at decision block 322, the digital assistant can proceed to ACT 324 to select and provide 3P content. The digital assistant component can transmit a request for content to a remote data processing system having a content selector component. The content selector component can receive the request, along with information that facilitates real-time content selection process. The content selector component can provide the selected content item to the digital assistant component. The digital assistant component can receive the content item and present the content item (e.g., play the audio content item), or provide the content item to the application 118 for presentation via the application (e.g., via an audio or visual content slot in the application).

The digital assistant can determine whether to reset the NLP to a default state at decision block 326 (e.g., subsequent to ACT 324 or if decision block 322 results in the negative, or independently from ACT 324 or decision block 322). The digital assistant can determine whether to reset the NLP based on the state of the application, such as whether the application is active, deactivated, terminated, in standby, or uninstalled. If the digital assistant determines not to reset the NLP, the digital assistant component can proceed to ACT 328 to maintain the NLP. If, however, at decision block 326 the digital assistant component determines to reset the NLP, the digital assistant component can proceed to ACT 330 to revoke updates to the NLP to reset the NLP to a default or initial state (e.g., prior to the declaration-based real-time update of ACT 312).

Thus, this technical solution can improve NLP processing in order to detect values for parameters in a request received in a voice-based computing environment, and provide the detected values for input into an application. The digital assistant component can receive a declaration from an application to identify parameters and types of values for the parameters, and then use the detected types to perform NLP processing on voice input. For example, the type of parameter or value can be "time", "location", or an application defined parameter type such as TableType with associated application-defined values such as "booth", "round table", and "window view". In another example, the parameter type can be restaurant names which can facilitate the digital assistant component identifying restaurant names in voice input, as opposed to names of people or geographic areas.

Figure 4:
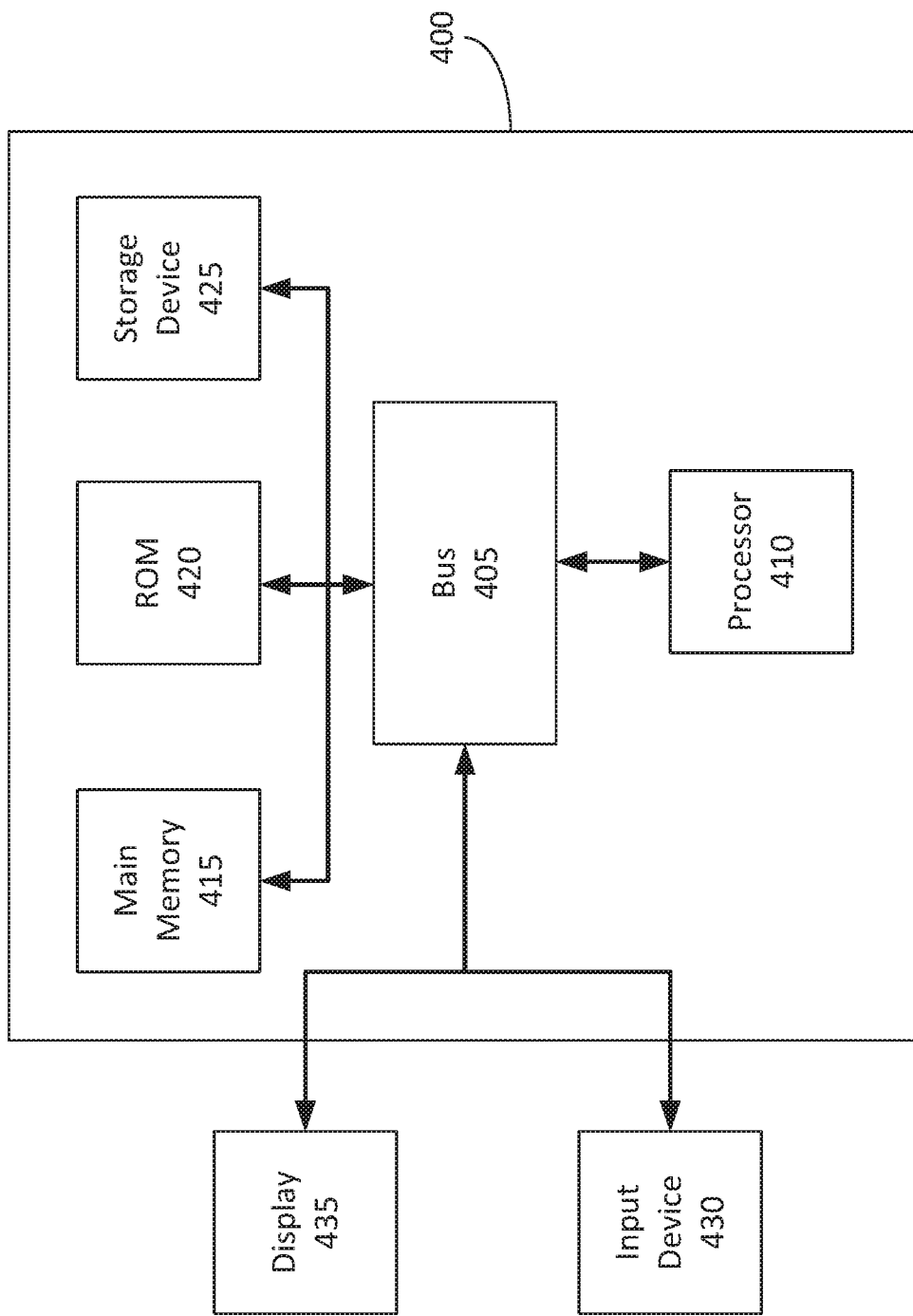
FIG. 4 is a block diagram illustrating a general architecture for a computer system that can be employed to implement elements of the systems depicted in FIG. 1 and FIG. 2, and the method depicted in FIG. 3.

FIG. 4 is a block diagram of an example computer system 400. The computer system or computing device 400 can include or be used to implement the system 100, or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 122. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 122.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 128 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The digital assistant component 106, direct action API 116, interface 104, NLP component 108 and other data processing system 102 components can include or share one or more data processing apparatuses, systems, computing devices, or processors. The digital assistant server 144 and content selector component 146 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the digital assistant server 144 from the digital assistant component 106 of the computing device 128 or the 3P content provider device 140).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 108 or the direct action API 116, can be a single component, app, or program, or a logic device having one or more processing circuits, or executed by one or more processors of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, devices, products or services described as 3P or third party such as the 3P digital content provider device 140 can be or include, partially or entirely, first party devices, products or services, and can be commonly owned by an entity associated with the data processing system 102, the digital assistant server 144, or other components. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to interface with applications, comprising:
one or more processors and memory;
a digital assistant component executed by the one or more processors and memory to:
activate, responsive to first input audio, an application for execution on a client computing device and cause the application to declare, to the digital assistant component via a protocol, a function the application is configured to perform;
modify, subsequent to activation of the application and based on the function the application is configured to perform, a natural language processing technique responsive to the function declared by the application, to increase a likelihood of detection of one or more parameters relative to the natural language processing technique not modified based on the function;
receive a second input audio signal detected by the client computing device;
process, via the modified natural language processing technique, the second input audio signal to detect one or more parameters;

determine, based on a comparison between the one or more parameters and the function declared by the application, that the one or more parameters are compatible for input into an input field of the application activated by the digital assistant component on the client computing device;

generate, responsive to the determination of compatibility and based on the one or more parameters, an action data structure for the application;

input the action data structure into the application via the protocol to cause the application to execute the action data structure and update a user interface comprising a user interface element of the application;

identify an available content slot in the user interface element of the application;

transmit, responsive to identifying the available content slot, a request for a content item to a content selector component; and present, responsive to receipt of the content item from the content selector component and via the user interface of the application, the content item selected by the content selector component.

2. The system of claim 1, comprising:
the digital assistant component to generate the request based on the action data structure.

3. The system of claim 1, comprising:
the digital assistant component to generate the request based on the function declared by the application.

4. The system of claim 1, comprising:
the digital assistant component to generate the request based on the modified natural language processing technique.

5. The system of claim 1, comprising:
the digital assistant component to generate the request based on the updated user interface element of the application.

6. The system of claim 1, comprising:
the digital assistant component to present the content item via audio output.

7. The system of claim 1, comprising:
the digital assistant component to present the content item via an output interface different from the user interface of the application.

8. The system of claim 1, comprising:
the content selector component to select the content item during a real-time content selection process.

9. The system of claim 1, comprising:
the content selector component to select the content item based on the function declared by the application.

10. The system of claim 1, comprising:
the content selector component to select the content item based on the one or more parameters detected in the second input audio signal.

11. The system of claim 1, comprising:
the content selector component to select the content item based on the application.

12. The system of claim 1, comprising:
the content selector component to select the content item based on the action data structure input into the application.

13. The system of claim 1, wherein the user interface of the application comprises a graphical user interface.

14. A method of interfacing with applications, comprising:
activating, by a digital assistant component executed by one or more processors, responsive to first input audio, an application for execution on a client computing device and cause the application to declare, to the digital assistant component via a protocol, a function the application is configured to perform;

modifying, subsequent to activation of the application and based on the function the application is configured to perform, by the digital assistant component, a natural language processing technique responsive to the function declared by the application, to increase a likelihood of detection of one or more parameters relative to the natural language processing technique not modified based on the function;

receiving, by the digital assistant component, a second input audio signal detected by the client computing device;

processing, by the digital assistant component via the modified natural language processing technique, the second input audio signal to detect one or more parameters;

determining, by the digital assistant component, based on a comparison between the one or more parameters and the function declared by the application, that the one or more parameters are compatible for input into an input field of the application activated by the digital assistant component on the client computing device;

generating, by the digital assistant component responsive to the determination of compatibility and based on the one or more parameters, an action data structure for the application;

inputting, by the digital assistant component, the action data structure into the application via the protocol to cause the application to execute the action data structure and update a user interface comprising a user interface element of the application;

identifying, by the digital assistant component, an available content slot in the user interface element of the application;

transmitting, by the digital assistant component, responsive to identifying the available content slot, a request for a content item to a content selector component of a remote data processing system; and presenting, by the digital assistant component responsive to receipt of the content item from the content selector component of the remote data processing system and via the user interface of the application, the content item selected by the remote data processing system.

15. The method of claim 14, comprising:
generating, by the digital assistant component, the request based on the action data structure.

16. The method of claim 14, comprising:
providing, by the digital assistant component, the content item to the application for presentation via the user interface of the application.

17. The method of claim 14, comprising:
presenting, by the digital assistant component, the content item via audio output.

18. The method of claim 14, comprising:
selecting, by the remote data processing system, the content item during a real-time content selection process.

19. The method of claim 14, comprising:
selecting, by the remote data processing system, the content item based on the function declared by the application.

* * * * *